United States Patent [19]

Swanson

[11] Patent Number: 5,781,298
[45] Date of Patent: Jul. 14, 1998

[54] LIGHT MIXING TECHNIQUE FOR ISOLATION AND AMPLIFICATION OF LASER SIGNAL FROM BACKGROUND NOISE DUE TO SCATTERING IN TURBID MEDIA

[75] Inventor: Nancy L. Swanson, Colonial Beach, Va.

[73] Assignee: The United States of America as represented by the Secretary of the Navy, Washington, D.C.

[21] Appl. No.: 755,819

[22] Filed: Nov. 26, 1996

[51] Int. Cl.[6] .................................................. G01B 9/02
[52] U.S. Cl. ........................ 356/349; 356/347; 356/353
[58] Field of Search .................................. 356/345, 347, 356/353, 349

[56] References Cited

U.S. PATENT DOCUMENTS 3,735,036  5/1973  Macovski .................. 356/347
5,619,325  4/1997  Yoshida ..................... 356/349

*Primary Examiner*—David C. Nelms
*Assistant Examiner*—Robert Kim
*Attorney, Agent, or Firm*—Harvey A. Gilbert

[57] ABSTRACT

A coherent light beam is split to form optical signals that follow separate optical paths to a light beam combiner. One optical signal is frequency modulated reference signal. The optical signal is directed to the object being detected. A light collector is arranged to collect light that has impinged upon the object. The collected light from the object and the reference signal are optically heterodyned. The heterodyned signals are detected by a photodiode that produces electrical signal that are processed to determine the shape of the object being detected.

8 Claims, 2 Drawing Sheets

5,781,298

LIGHT MIXING TECHNIQUE FOR ISOLATION AND AMPLIFICATION OF LASER SIGNAL FROM BACKGROUND NOISE DUE TO SCATTERING IN TURBID MEDIA

BACKGROUND OF THE INVENTION

1. Field of the Invention

This invention relates generally to detecting objects imbedded in turbid media such as smoke, fog and water. This invention relates particularly to heterodyning optical signals to enhance a desired signal while averaging out scattered and ambient noise. Still more particularly this invention relates to a using heterodyne detection in a laser-line-scan system for increasing signal-to-noise and resolution in diverse applications such as mine hunting, diving, salvage or medical imaging.

2. Description of the Prior Art

The difficulties detecting objects imbedded in turbid media are well known. In laser-based systems, the primary causes of image degradation are the short range due to high extinction coefficients for turbid media and the large return of backscattered, forward-scattered, and ambient light into the detector washing out the signal. The scattering problem is reduced, but not eliminated by range-gating and line-scan systems.

SUMMARY OF THE INVENTION

This invention comprises a light mixing technique which will enhance the signal while, at the same time, averaging out the scattered and ambient noise. The present invention provides an improved apparatus and method for detecting objects such as underwater mines. The invention also has application in underwater salvage operations and in medical imaging devices.

A system according to the present invention for detecting an object in a turbid medium may suitably comprise, consist of, or consist essentially of the following described elements: a coherent light source for producing a coherent light beam and first beam splitter arranged to receive the coherent light beam and produce a first optical signal directed along a first optical path and a second optical signal directed along a second optical path, a modulator placed in the second optical path for modulating the first optical signal at a frequency $\Omega$, and a light reflector arranged to receive the second optical signal and direct a reflected beam toward the object, a light collector arranged to collect portions of the second optical signal that have impinged upon the object, and an optical signal combiner arranged to heterodyne optical signals output from the modulator and the portions of the second optical signal that have impinged upon the object and that have been collected by the light collector and produce a signal that indicates the shape of the object being detected.

The light reflector preferably is movable to scan the reflected beam across the object.

The modulator preferably is an acousto-optic modulator arranged to frequency modulate the first optical signal.

BRIEF DESCRIPTION OF THE DRAWINGS

As shown in FIG. 1, in typical Quasi-Elastic Light Scattering Spectroscopy (QELSS) experiments a heterodyne technique is used to measure the scattered spectrum of a laser beam after the beam interacts with a fluid mixture. The QELSS technique is used to determine properties such as particle size and diffusion coefficient of the fluid.

Figure 1:
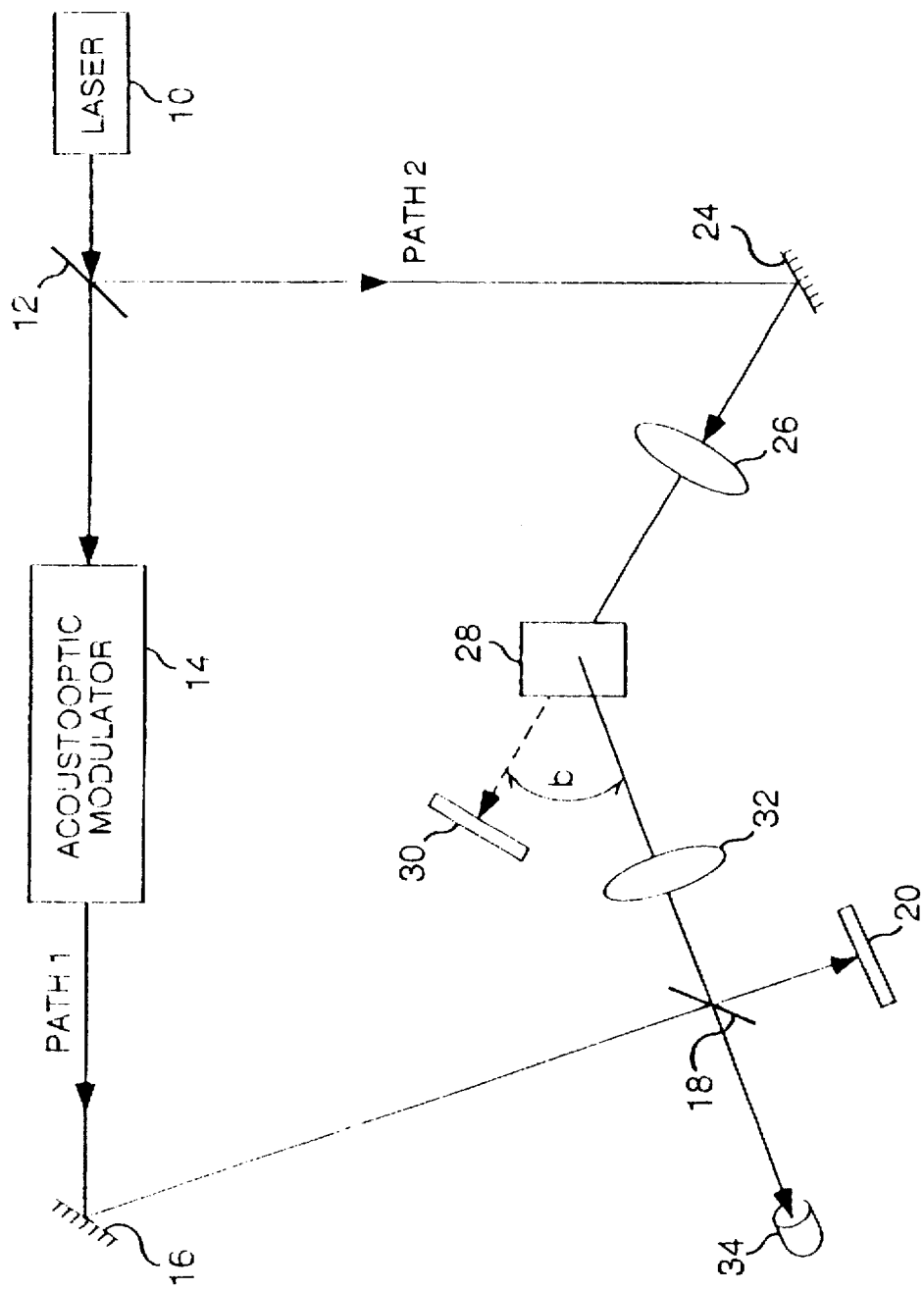
FIG. 1 illustrates a prior art system for quasi-elastic light scattering spectroscopy to measure the scattered spectrum of a laser beam after the beam has interacted with a fluid mixture.

The apparatus of FIG. 1 includes a laser 10 that directs a laser beam to a first beam splitter 12. The first beam splitter 12 splits the laser beam into two portions that follow the optical paths indicated as PATH 1 and PATH 2 in FIG. 1. The beam in PATH 1 propagates from the beam splitter 12 to an acousto-optic modulator 14. The acousto-optic modulator may be a Bragg cell that frequency modulates the beam in PATH 1 at a frequency $\Omega$. The laser field in PATH 1 may then be written as $$E_M = A e^{-i(\Omega + \omega)t}, \qquad (1)$$

where A is the amplitude and $\omega$ is the frequency of the laser. For simplicity the laser signal is assumed to have a single-frequency.

The optical signal in PATH 1 propagates from the acousto-optic modulator 14 to a mirror 16 that is arranged to reflect the signal to a second beam splitter 18. The portion of the beam that travels straight through the second beam splitter 18 impinges upon a first light absorber 20.

The portion of the laser beam that follows PATH 2 reflects at a mirror mine neutralization vehicle 24 and then propagates to a lens 26. The lens 26 focuses the beam on a sample cell 28 that contains a highly scattering medium. Light that is unscattered is incident upon a second light absorber 30. The scattered light is collected at a fixed angle $\theta$ by a lens 32. The field of the scattered light is $$E_s = B e^{-i(\omega + \Phi_R + \Phi_P)t}, \qquad (2)$$

where $\Phi_P$ is a constant phase difference introduced by any path differences between beams 1 and 2, and $\Phi_R$ is a random phase difference caused by interaction of the photon field with the scattering medium. This could be a Doppler shift or a shift caused by coupled thermal concentration fluctuations.

The lens 32 directs the collected light to the second beam splitter 18. The beam splitter 18 combines the light that has been scattered from the sample cell 28 and then collected by the lens 30 with the light that has followed PATH 1. The optical paths, the lens 32, and the second beam splitter are arranged so that combined optical signals from the paths propagate to a photodiode 34.

The autocorrelation of the intensity collected with the photodiode 34 at the output of the second beam splitter 18 is $$\langle I(t)I(t+\tau)\rangle = Q^2 \{I_M^2 + 2I_M \cos(\Omega\tau)(\text{Re}\langle E_s^*(t)E_s(t+\tau)\rangle)\}, \qquad (3)$$

where Q is the efficiency of the photodiode 34. Equation (3) is derived by B. J. Berne and R. Pecora, Dynamic Light Scattering (John Wiley & Sons, New York, 1976), p. 42, with the constraints that:

(a) A>>B, which means that the strength of the scattered field is much less than that of the modulated field;

(b) the two fields are statistically independent; and (c) the fluctuations in the modulated field are negligible.

The term in brackets on the right hand side of Equation (3) is the autocorrelation function of the scattered field. The Fourier transform of this is the scattered spectrum.

A crucial aspect of the QELSS technique is the concept of a "coherence area." That is, Equation (3) is derived under the assumption that the optical field is spatially coherent over the surface area of the photodetector 34. If the scattered field source is spatially incoherent, the scattered field will only be spatially coherent over a limited area $A_c=2\lambda^2/\alpha$ where $\alpha$ is the solid angle subtended by the source at the detector 34. As the detector size increases, its dimensions will eventually surpass the distance over which the field is spatially coherent. The fluctuations in the photo count produced at different points on the detector 34 will then be uncorrelated, and the light beating currents from the uncorrelated areas will be randomly phased with respect to each other and will add in a random walk fashion. Thus, the fluctuations will be averaged over the area of the detector 34. The way to remedy this situation is to make the scattering volume small by using the lens 26 to focus the beam inside the scattering sample so that all the collected light is scattered from a volume so small that the light is considered to be correlated.

This invention uses a novel application of the QELSS technique in which the coherence area condition is purposefully violated. If the coherence area criterion is violated, the scattered field correlation averages to zero while the unscattered signal is retained and augmented by the modulated signal.

Figure 2:
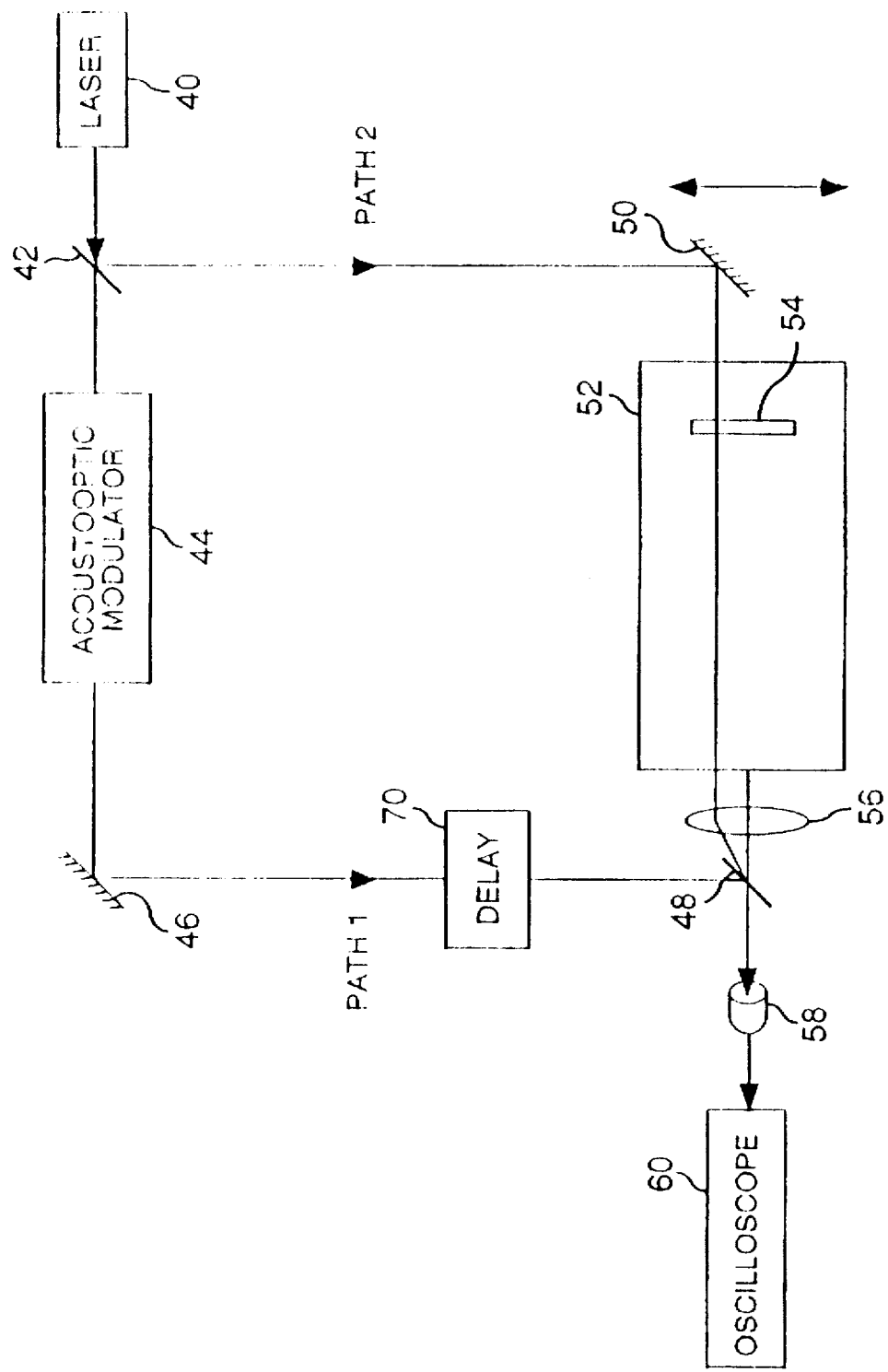
FIG. 2 illustrates a system for quasi-elastic light scattering according to the present invention.

FIG. 2 illustrates an optical system that may be used to practice the present invention. A laser 40 produces a beam that impinges upon a first beam splitter 42 that splits the laser output into beams that follow paths labeled PATH 1 and PATH 2. The beam in PATH 1 propagates to an acousto-optic modulator 44. The acousto-optic modulator positioning component 44 may be a Bragg cell as in the prior art apparatus of FIG. 1 that frequency modulates the beam in PATH 1 at a frequency $\Omega$. The modulated output of the acousto-optic modulator 44 impinges upon a mirror neutralizing component 46 that reflects the modulated beam to a second beam splitter 48.

The light beam in PATH 2 propagates from the beam splitter 42 to a mirror 50. The mirror 50 directs the reflected beam to a tank 52 that contains a scattering medium such as turbid water that includes a bar target 54. Instead of collecting only the scattered light at a fixed angle as in the prior art, the light that has propagated straight through the sample volume is collected by a lens 56. This can easily be extended to traversing the sample, reflecting from a target embedded in the sample and traversing back through the sample. The lens 56 directs the collected light to the second beam splitter 48 where the beams that have followed the two optical paths are combined (heterodyned) and then directed to a photodiode 58.

FIG. 2 represents the target 54 formed as a bar embedded in the tank 52 of turbid water. The mirror 50 is arranged to move along a path parallel to the target 54 so that the light beam scans across the target 54. The heterodyned signal is detected at the photodiode 58 and fed to an oscilloscope 60. A one dimensional image of the bar target 54 is then constructed. The invention may be include situations where the light beam reflects from the target 54 instead of being transmitted through it.

The field of the beam in PATH 2 has a scattered component and an unscattered component and may be expressed as:

$$E_2 = E_s + E_L = Be^{-i(\omega t + \Phi_R + \Phi_P)} + Ce^{-i(\omega t + \Phi_P)}, \quad (4)$$

where B is the portion of the beam in PATH 2 that has been scattered in the volume of the tank 52 and C is the portion which has not. The unscattered component is the signal of interest. The phase $\Phi_P$ representing the difference in optical path length between the beams in PATH 1 and PATH 2 is common to both components. The phase $\Phi_R$ is the random phase of the scattered light, which can be attributed to frequency shifts, as in the previous case, but it can also be attributed to a difference in path length traversed by the scattered light. In this case the autocorrelation of the intensity is $$\langle I(t)I(t+\tau)\rangle = Q^2\{I_M^2 + 2I_M\cos(\Omega t)(Re(E_S^*(t)E_s(t+\tau)) + I_L)\} \quad (5)$$

where $I_L$ is the intensity of the unscattered laser signal. If the coherence area condition is met, i.e., the optical field is maintained spatially coherent over the surface area of the photo detector 34, the scattered field will be correlated and the bracketed term in Eq. (5) will be non-zero. However, if the scattering volume is large, the scattered field will no longer be correlated, and the bracketed term of Eq. (5) is zero, which is exactly the desired result. The intensity correlation then is $$\langle I(t)I(t+\tau)\rangle = Q^2\{I_M^2 + 2I_MI_L\cos(\Omega t)\}, \quad (6)$$

where the first term of Eq. (6) is a constant offset and the second term is the signal of interest enhanced by the modulated signal.

In fact, it is unnecessary to execute the autocorrelation of the detected intensity for this method to perform satisfactorily. The intensity detected at the photodiode 58 is $$I(t)=Q(I_M+2AC\cos(\Omega t-\Phi_R)+2AC\cos(\Omega t)), \quad (7)$$

where the constant phase, $\Phi_p$, has been set to zero for simplicity and A, B and C are assumed to be real numbers. The middle term of Eq. (7) contains the random phase of the scattered light, which, using a well-known trigonometric identity, evaluates to $$\cos(\Omega-\Phi_R)=\cos(\Omega t)\cos(\Phi_R)+\sin(\Omega t)\sin(\Phi_R). \quad (8)$$

Consider the phase detected at different points on the detector 58. At one point, the phase is due to a scattering event somewhere in the scattering volume of the tank 52. At another point the phase is due to a different scattering event elsewhere in the volume. These two scattering events are completely uncorrelated, and the two phases are totally random. Thus, integrating over the entire area of the detector 58 results in an averaging of the sine and cosine of these random phases. The middle term is therefore zero, which results in a detected intensity of:

$$I(t)=Q\{I_M+2AC\cos(\Omega t)\}. \quad (9)$$

Recall that C is the amplitude of the unscattered laser field and that A>>C is the amplitude of the modulated field. A measure of the peak-to-peak amplitude of the sinusoidal signal will yield Q2AC. The signal is increased by a factor of 2A/C because the intensity of the signal measured directly would be $QC^2$, and the noise has been averaged to zero. Thus the noise has been effectively eliminated while at the same time the signal has been amplified by optical beating.

It should be noted that the technique described above with reference to FIG. 2 is different from "low-coherence optical tomography" (LCOT). In LCOT, the modulation is provided by a piezoelectric crystal (not shown) mounted on one of the mirrors (mirror 50 in FIG. 2, for example). The piezoelectric crystal has a range of a few micrometers. The coherence length of the laser must therefore be less than a few micrometers in order to sweep through to the first zero in the fringe visibility function. This is the pattern of interest that creates the modulated signal. The scattered light has a random phase and interferes with the reference beam in the same way so that the scattered signal averages to zero. However, this method only works for very low coherence lasers such as diode lasers, for example.

The method according to the present invention modulates the reference beam with the acousto-optic modulator 44 at a known, fixed frequency. This fixed frequency is the detected frequency regardless of the coherence length of the laser 40. The method according to the present invention is therefore applicable to all types of lasers with the only requirement being that the optical path difference between the reference beam and the signal beam is within the coherence length of the laser. This can easily be achieved by placing an optical fiber delay 70 in PATH 1.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A system for detecting an object in a turbid medium, comprising:

a coherent light source for producing a coherent light beam;

a first beam splitter arranged to receive the coherent light beam and produce a first optical signal directed along a first optical path and a second optical signal directed along a second optical path;

a modulator placed in the first optical path for modulating the first optical signal at a frequency $\Omega$;

a light reflector arranged to receive the second optical signal and direct a reflected beam toward the object;

scanning means for moving the light reflector to scan the reflected beam across the object;

a light collector arranged to collect portions of the second optical signal that have impinged upon the object; and an optical signal combiner arranged to heterodyne optical signals output from the modulator and the portions of the second optical signal that have impinged upon the object and that have been collected by the light collector to produce a signal indicative of the shape of the object.

2. The system of claim 1 wherein the modulator is an acoustooptic modulator arranged to frequency modulate the first optical signal.

3. The system of claim 1 wherein the modulator is an acousto-optic modulator arranged to frequency modulate the first optical signal.

4. The system of claim 1, further comprising a photodetector arranged to detect the heterodyned signals.

5. A method for detecting an object in a turbid medium, comprising the steps of:

providing a coherent light beam; arranging a first beam splitter for receiving the coherent light beam and producing a first optical signal directed along a first optical path and a second optical signal directed along a second optical path;

placing a modulator in the first optical path for modulating the first optical signal at a frequency $\Omega$;

arranging a light reflector for receiving the second optical signal and directing a reflected beam toward the object;

moving the light reflector to scan the reflected beam across the object;

arranging a light collector for collecting portions of the second optical signal that have impinged upon the object; and arranging an optical signal combiner for heterodyning optical signals output from the modulator and the portions of the second optical signal that have impinged upon the object and that have been collected by the light collector to produce a signal indicative of the shape of the object.

6. The method of claim 5 including the step of forming the modulator as an acousto-optic modulator arranged to frequency modulate the first optical signal.

7. The method of claim 5 including the step of forming the modulator as an acousto-optic modulator arranged to frequency modulate the first optical signal.

8. The method of claim 5 including the step of detecting the heterodyned signals with a photodetector.

* * * * *